Oct. 23, 1934.   J. C. BUERKE   1,978,100
DYNAMO ELECTRIC MACHINE
Filed March 23, 1931
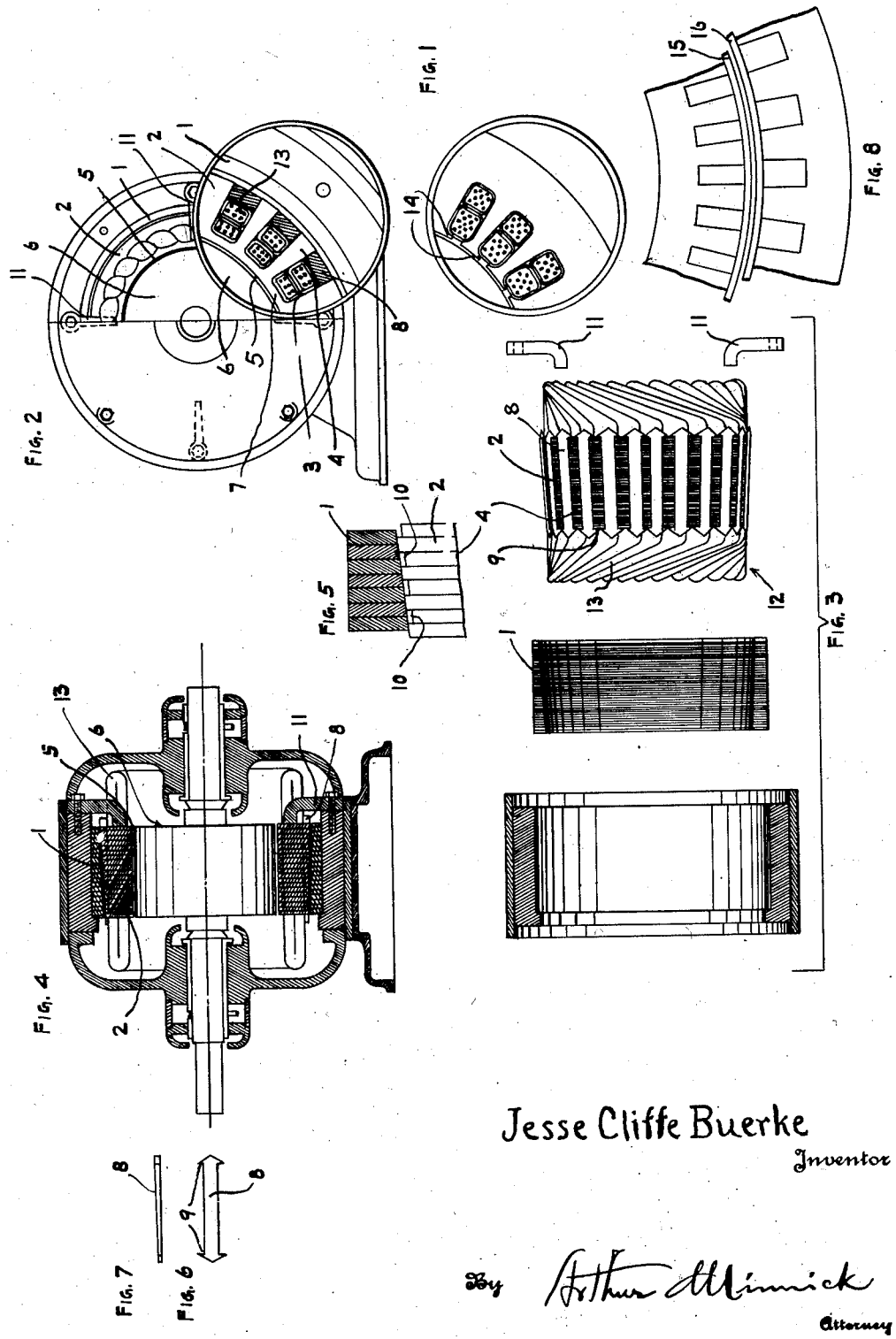
Jesse Cliffe Buerke
Inventor Patented Oct. 23, 1934

1,978,100

UNITED STATES PATENT OFFICE 1,978,100

DYNAMO ELECTRIC MACHINE

Jesse Cliffe Buerke, Tampa, Fla.

Application March 23, 1931, Serial No. 524,456

7 Claims. (Cl. 171—252)

This invention relates to dynamo electric machines and principally to alternating current machine elements which in present practice have an exterior member provided with slots to receive windings, the slots opening inward or toward the central axis. Other forms of dynamo electric machines may use varied applications of the principle of this invention as suggested later.

A principal object of the invention is to provide an improved construction and a more efficient method of assembling the parts of a dynamo electric machine.

A further object is to provide an assembly in which the windings are made as standard interchangeable cartridge units which may be removed for cleaning, repair, replacement or change of characteristics.

Another object is to provide a construction in which the windings are carried in closed or "tunnel" slots in a complete magnetic yoke when the machine is assembled but in which the windings are applied in outwardly opening slots during manufacture or repair with the same ease as in the winding of the armature of an ordinary direct current machine.

In the accompanying drawing:

Figure 1 illustrates a section of the present "semi-closed" slot type stator;

Figure 2 is an end view of a machine embodying the principal form of this invention, with a magnified section in detail;

Figure 3 is an "exploded" view of the cartridge winding assembly and mountings;

Figure 4 is a vertical longitudinal section of a completed machine;

Figure 5 is a sectional detail of the lamination assemblies at their separation line;

Figures 6 and 7 are top and side views of wedges or tapered top sticks; and

Figure 8 is a fragmentary section of details of applications to alternate forms of machines.

The present invention primarily comprises constructing the laminations of the coil carrying element in two sections to provide a structure in which the inner section will have slots opening inward from its outer surface like an ordinary direct current armature, into which the windings may be laid from the outside, and this section may then be inserted into the other section of magnetic material to complete the magnetic yoke and form a complete ring-like tunnel slot winding.

In the embodiment of the invention illustrated in Figures 2, 3, and 4, showing the invention as applied to a standard induction motor stator having an internal squirrel cage rotor, the exterior member is shown as made in two sections. Of these, the outer section 1, consists of a plurality of continuous laminations assembled to form a substantially cylindrical outer ring of magnetic material. The inner section 2, consists of a plurality of continuous laminations assembled to form a complete ring provided with outwardly opening slots 3, separated by teeth 4, and having an axial bore 5, with a smooth continuous surface closely adjacent to the rotor 6, forming a complete inner magnetic yoke. The smoothly ground surface makes possible a shorter average magnetic gap with the same mechanical clearance and the reluctance of the magnetic circuits through stator, air gap, and rotor is greatly reduced by the increased effective magnetic area presented to the air gap by the smooth continuous inner stator face. The magnetic material on this surface is increased by the amount of the area of the slots normally cut in the conventional stator face. The reluctance is inversely proportional to the sectional area of the magnetic path.

The amount of metal forming the bridge 7, at the base of the teeth, needs be only as much as is necessary to close the inner ends of the slots formed between the teeth and to provide sufficient strength, and will be proportioned to provide the desired electro-magnetic characteristics. The laminations of the outer section 1, of the exterior member will preferably be assembled in a tubular group as they are to be mounted in the frame of the machine and the inner surface of the group will be ground smooth and polished, preferably with a taper from one end to the other, as best shown in Figures 3, 4, and 5.

During manufacture, the toothed laminations of the inner section of the exterior member will preferably be assembled on a mandrel or substantially cylindrical work carrier which snugly fits the bore in which the rotor runs. The teeth of all the laminæ will be aligned to form open slots on the exterior of the assembly. This assembly will be tightly clamped or confined on the carrier between rings or clamps having a radial thickness less than that of the bridges between the teeth of the laminations. This core, mounted on the work carrier, with its slots opening outwardly forms a structure very similar to an ordinary direct current armature core, with wide open slots for the insertion of insulation and winding from the outside.

Any form of winding or coil may be used in this type of construction and in each case the winding operation will be much easier because of the wide open slots as well as because of the fact that the slots open outwardly, giving unlimited working room.

The stiff or stacked form wound coil, which may be impregnated and better insulated for use in particularly wet or unfavorable locations, can be used easily in this type of high efficiency machine, while in former construction, even the semi-closed slot shown in Figure 1 could not be used, as the stacked coil required the inefficient, open slot for insertion.

In small motors, or medium size high speed motors of the old type, the opening through the stator being of small diameter, it is a very slow, tedious and difficult job to insert coils into the inwardly opening slots, especially in stators of the so-called semi-closed slot type. The crowded space in which the work must be done, combined with the fact that the wires of the coil must be "fanned out" in order to insert one wire at a time into the narrow slot opening requires extreme care to prevent damaging the insulation on the wire and even skilled workmen often allow crossing over of individual wires within the slot. Such crossings in time become weak points in the insulation because of the concentration at the crossings of mechanical strain and wear under the continual vibration of service. The usual "soft" or "mush" coil, or the individual wire or form wound concentric or "pancake" coil could be inserted into the proposed form of slot much more easily and with less danger of crossing wires or damaging the insulation within the slot. Probably the cheaper modification in the form of the continuous interwoven string or loop coil winding would be used to a large extent in the competitive price motors for ordinary use with this type of core.

The assembled core unit, with winding, will be ground to a taper corresponding to that of the interior of the outer section of the exterior member as indicated in Figures 3 and 4, permitting the ready insertion of the assembly within the outer section, whereupon the magnetic yoke will be completed around the windings.

Tapering the inner section of the core will result in a variation in depth of the slot from end to end, and as the coil, proper, will be of equal cross-sectional area at both ends of the slot, it is proposed to compensate for this variation in depth by a difference in the thickness of the insulation or a top stick. Top sticks 8 will be made from stock with the same taper as the standard taper of the cores as shown in Figures 6 and 7, and the entire contents of the slot accurately proportioned so that the proper pressure or squeeze is exerted throughout the slot by the pressure of the tapered surface of the outer assembly of laminations on the top sticks as the laminations are brought into contact with the tops of the teeth of the inner section of the stator core.

Top sticks 8 extend beyond the ends of the slots and are provided with an enlarged section or shoulder 9, at each end immediately after emerging from the slot, as shown in Figures 3 and 6, the purpose of the enlarged ends or shoulders being to hold the laminæ of the inner member 2, of the core closely together.

The eddy current losses which might result from misalignment and consequent bridging of the divisions between the laminæ at the division of the two sections of the core are prevented by so shaping and assembling the individual sheets of each core that adjacent sheets do not extend to the surface and make contact at immediately adjacent points, as shown at 10 in Figure 5.

In Figures 2, 3, and 4, the clamps 11 illustrate one manner of holding the winding assembly and core in place but various other forms of fastenings will be found to suit different frame types. Actually the magnetic pull would tend to hold this winding assembly in place because the magnetic members 1 and 2 would be in close proximity while the pull toward the rotor and the normal torque would be across the running air gap. The magnetic attraction is inversely as the square of the distance.

In close places, such as the working of a thin vein of ore in a mine, it is frequently very desirable to be able to use a motor having considerable power but having small dimensions transverse the axis of the shaft. Insertion of stator coils into inwardly-opening slots is limited to cores of comparatively short length when the diameter of the motor is small, because of the limited bore within which the winder must work. Consequently alternating current motors in the small diameters are limited to very small horsepower.

Direct current motors, with their necessary brushes and dangers from sparking, are resorted to in many mining operations because a direct current armature may be made quite long and may be wound easily because the coils go into the slot from the outside, the added power capacity being gained in length parallel to the shaft.

As will be evident, the type of winding described herein may be made of considerable length with a corresponding increase in power, hence one of the objects of the present invention is to provide an alternating current machine which may be built in larger powers for a given diameter of stator bore.

High speed alternating current motors and generators are usually built in the smallest practical diameters, to reduce mechanical and vibration stresses. In a two pole stator, the coils should span half the circle, but in many machines, due to the difficulties of forming heavy rigid coils within the limited space, a coil span of much less than the exact angular distance between magnetic poles is used, resulting in a lower voltage generated per turn with a corresponding loss of power from a given amount of material in the machine.

In the proposed type of winding the coils may be conveniently installed in any desired span from the outside with plenty of working room, therefore it is an object of this invention to produce a winding which may be conveniently installed at full or "square pitch" in stators of the two pole type in small diameters.

In the proposed construction, the bore 5, of the inner section 2, of the outer member will be made smooth and polished so that there will be no projection of any kind to injure or to be injured by the rotor 6, if it should come in contact with the stator.

If through continued neglect, the rotor and stator have been allowed to rub until the laminations are damaged, because of worn bearings or from other causes, the replacement of the cartridge winding unit 12, comprising the core section 2 and the windings 13, will renew the factory quality in providing new laminations for the damaged portion and insure highest efficiency by avoiding eddy current losses. Therefore it is an object of this invention to provide a dynamo electric machine structure in which the entire laminated surface of one element adjacent to the running air gap may be renewed as one unit if damaged.

Oil from the bearings of motors and generators in service often spreads through the windings causing dust to accumulate and form a mud which cannot be cleaned by blowing out. It is customary to wash such windings in gasoline periodically, but due to the limited space and hidden crevices, it is practically impossible to thoroughly remove such accumulation of dirt and grease, which in time rots the insulation of the coils.

It is an object of this invention to provide a dynamo electric machine construction, such that the windings may be conveniently withdrawn from the machine so as to give free access for cleaning and leave the machine frame and bearings clear of electrical windings so that any means for cleaning, such as a water hose may be used on them.

Practice has shown that it is impossible to raise coils out of machines constructed with "semi-closed" slots for repairs after having been in service for some time, while this is regularly done in open slot machines. It is therefore an object of this invention to provide a winding assembly for closed slot, high efficiency dynamo electric machine elements which may be withdrawn for repairs.

The tips 14 of the laminations shown in the ordinary "semi-closed" slot type of construction illustrated in Figure 1, in the present construction are united by a bridge 7 in Figure 2 in such manner that the vibration of the tips, due to the alternating flux is reduced to a minimum, thereby practically eliminating the humming noise which is generated at those tips when free. An object of this invention is therefore to provide a dynamo electric machine which will operate more quietly.

In salient pole types of direct current field structures, it has been proposed to insert a distributed type of exciting and armature-reaction neutralizing field winding into slots cut from the outer peripheral surfaces of the sections of the pole pieces. These pole tips form sector shaped members, not self supporting or annular, which must be supported in relative position upon a frame or "work carrier" until fastened into permanent place in the field structure. Such an assembly is not suitable for commercial distribution to be inserted as a unit replacement part for machines in service, while the present invention provides a winding assembly which may be conveniently distributed as a standardized unit for use in the commercial field.

A further advantage of this invention is that the winding assembly may be installed in machines in working position without removing the rotor or disturbing the shaft.

It is an object of this invention to provide for dynamo electric machines, standard dimension core elements which will be wound for different phase, voltage, speed and frequency uses and form interchangeable units for insertion into standard frames, as desired, without destroying the former winding as is necessary in the present types where rewinding calls for stripping out the old winding.

Many other advantages of the standardized interchangeable core section to be manufactured as a factory product and sold as a merchandise item providing a replacement unit available for instant use will be readily apparent.

The ease with which the winding may be installed in the slots will so reduce the labor costs of winding as easily to offset the extra stamping and machining required, which incidentally, are "automatic" and less expensive operations than hand winding, so that this construction will be no more expensive than the present types under similar conditions and in similar quantities.

In the warehouse stock of the manufacturer, a given investment in interchangeable winding units, standard frames and standard rotors to combine for extreme flexibility of types to fill requirements for differences in speed, phase, frequency or voltage will provide a much more complete stock than at present as well as providing a service to customer-users for replacements.

The business of winding now scattered among many small repair shops and made available for factory volume by this structure represents an item of considerable value to the manufacturer.

From the user's standpoint, this type of motor not only would be more efficient, more rugged mechanically in case of bearing failure, better insulated and more easily cleaned, but in case of a burnout the renewal unit winding could be inserted with much less expense and loss of time than would be required to rewind, or to set a duplicate motor on the base, were the exact duplicate immediately available. Instead of depending upon the local repair man who may be inefficient, inexperienced and expensive, the rewinding is in effect concentrated in the factory having all the advantages of proper organization, equipment, skill, tests and materials, effectively reducing the costs. If the factory product is not at hand, the local repair or rewinding is more cheaply done than with the usual types.

When it is desired to change a motor to other characteristics, as a change of speed, phase, voltage, or frequency, this can be done in a few minutes and the value of the old winding unit retained for future use, giving the user a machine with two characteristics for interchange.

The central station's generating, transmission and distribution systems will derive considerable advantage with this type of motor load because of the reduction of losses by increased power factor.

Dynamo electric machines are regularly built in several forms, among which are both rotating interior members and stationary interior members, with primary windings in either inner or outer member and secondary or exciting windings on the opposite member. It will be obvious by reference to Figure 8 that this suggested composite tunnel slot development with its conveniences and efficiencies may be applied to any of these forms, and that the magnetic circuit closing ring 15 or 16, may be used in either the inner or the outer structure or in both as illustrated in Figure 8. These rings 15 and 16 will be assembled of laminations in the same manner as in member 1.

In machines where it might be desirable to insert the coils into open slots of either the interior or exterior member of a dynamo electric machine of the usual type, the composite tunnel slot advantages might be gained by the addition of rings of magnetic material closing the slots as shown at 15 and 16, in Figure 8.

Therefore, throughout this application the composite tunnel slot structure described may represent any member of such machine, whether rotor or stator, inside or outside, primary, secondary or exciting winding.

I claim:

1. A dynamo-electric machine element comprising a continuous laminated ring shaped magnetic member formed with slots, windings in said slots, and a continuous laminated ring-shaped magnetic member closing said slots the two members being separable as integral units.

2. An alternating current dynamo-electric machine comprising a stator having a complete ring of magnetic material provided with exterior teeth separated by slots, a winding in said slots, and a ring shaped magnetic member closing said slots and having an inner surface permitting the longitudinal withdrawal of the stator therefrom.

3. As an article of manufacture, a winding and magnetic assembly unit comprising a tubular magnetic member having slots in its outer periphery and a winding in said slots, the assembly unit having an outer surface adapted for longitudinal insertion into a dynamo electric machine having a second magnetic member having an inner periphery conforming to the outer periphery of said unit to form in effect a tunnel winding.

4. In dynamo-electric machines, as an article of manufacture and sale, an interchangeable cartridge unit comprising a laminated core having a continuous cylindrical bore to receive an element for relative rotation, the exterior periphery of the laminated core being formed with outwardly extending teeth separated by slots, and a winding in said slots the unit having an outer surface adapted for insertion longitudinally into a second magnetic member having an inner periphery adapted for contact with the outer periphery of the unit to form in effect a tunnel winding.

5. A dynamo-electric machine comprising two relatively movable elements, separated by an air gap, one element having a complete ring of magnetic material adjacent to the air gap and carrying a winding in closed slots, said element being divided into two tubular members, one an outer member forming the outer closure of the slots, and the other an inner member, the meeting surfaces of the inner and outer members conforming to each other whereby to permit longitudinal withdrawal and replacement of the winding with the magnetic material between the windings and between the winding and the air gap as a cartridge unit.

6. In a dynamo-electric machine, in combination, a frame member, a magnetic ring-shaped member supported by the frame member, a tubular magnetic member provided with exterior slots, a winding in said slots, the exterior of the tubular member conforming to the interior of the ring member whereby the tubular member may be inserted within the ring member to complete the magnetic yoke.

7. A structure as in claim 6, having a substantially cylindrical rotor mounted on a shaft, a bearing supporting the shaft at one end of the rotor, and in which the tubular member has a substantially cylindrical bore surrounding the rotor and permitting the withdrawal of the tubular member parallel to the shaft.

JESSE CLIFFE BUERKE.